July 14, 1925.

K. J. POOLE 1,545,600

PIE CRUST CUTTER AND EDGE MARKER

Filed Oct. 31, 1924

Inventor
Kenneth James Poole.

By Adam E. Fisher.
Attorney

Patented July 14, 1925.

1,545,600

UNITED STATES PATENT OFFICE.

KENNETH JAMES POOLE, OF CLEARFIELD, PENNSYLVANIA.

PIE-CRUST CUTTER AND EDGE MARKER.

Application filed October 31, 1924. Serial No. 746,927.

*To all whom it may concern:*

Be it known that KENNETH JAMES POOLE, a citizen of the United States, residing at Clearfield, in the county of Clearfield and State of Pennsylvania, has invented certain new and useful Improvements in Pie-Crust Cutters and Edge Markers, of which the following is a specification.

This invention is of a pie crust cutter and edge marker, and the object of the invention is to provide a simple and efficient device of this kind having a cutting disc for cutting off the excess dough around the edge of the pie pan, and a marking wheel at the side of the cutting disc for simultaneously marking or crimping the edge of the pie crust.

In the drawing—

Figure 1:
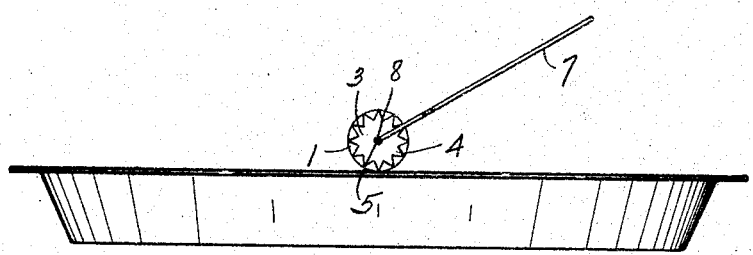
Figure 1 is a side view showing the device in use.
Figure 2:
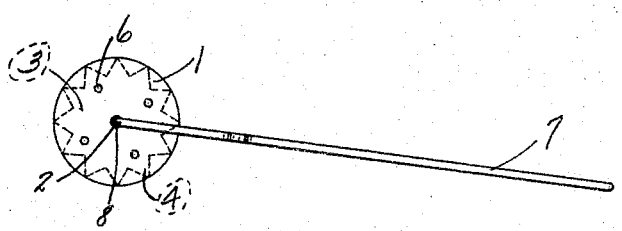
Figure 2 is a side elevation of the device taken from the rear.
Figure 3:
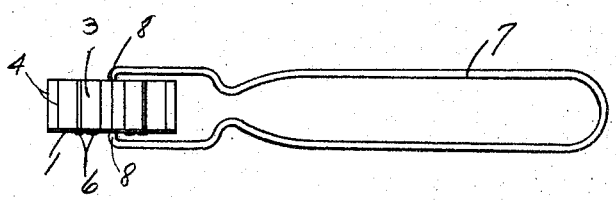
Figure 3 is a plan view.

The invention is made up of a metal cutting disc 1 having a central handle hole 2, and a wooden marking wheel 3 of the same diameter as the cutting disc 1, and having a plurality of teeth 4 formed around its periphery and a central handle hole 5. The disc 1 is fastened to the side of the wheel 3 by means of tacks 6. A wire handle 7 has ends 8 inwardly bent to engage the handle holes 2 and 5 of the disc and wheel.

The device is operated by running the disc 1 around the edge of the pie pan 8 containing the newly made pie, before baking, the wheel 3 bearing upon the edge of the pan. This operation both cuts off the excess dough at the edge of the pan and marks or crimps the edge of the pie crust overlapping the top edge of the pan. The constructing of the disc and wheel of equal diameter is the essential feature of this invention, as thereby the edge of the cutting disc bears directly down upon the crust coincidently with the wheel, and there is no tendency of the disc to cut outwardly and away from the edge of the pan, as is the case where the disc is made of larger diameter than the wheel.

Another feature of the invention is the construction partly of wood and partly of metal. The wheel being of wood enables the disc to be easily fastened thereto by tacks and without the use of solder.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

A device of the kind described, comprising a metal cutting disc having a central handle hole; a wooden marking wheel of the same diameter as the said cutting disc and having also a central handle hole; means for securing the cutting disc to the marking wheel; and a handle adapted to engage the handle holes of the said disc and wheel.

In testimony whereof I affix my signature.

KENNETH JAMES POOLE.

Witnesses:
  Mrs. ELIZABETH POOLE,
  GEO. W. RALSTON.